US012710915B2

(12) United States Patent
Hirsch et al.

(10) Patent No.: US 12,710,915 B2
(45) Date of Patent: Aug. 18, 2026

(54) VOICE MODIFICATION FOR WEARABLE DEVICE

(71) Applicant: BRAGI GmbH, Munich (DE)

(72) Inventors: Eric Christian Hirsch, Munich (DE); Luigi Alessandro Belverato, Munich (DE); Martin Guski, Munich (DE)

(73) Assignee: BRAGI GmbH, Munich (DE)

( * ) Notice: Subject to any disclaimer, the term of this patent is extended or adjusted under 35 U.S.C. 154(b) by 384 days.

(21) Appl. No.: 18/053,645

(22) Filed: Nov. 8, 2022

(65) Prior Publication Data

US 2023/0153056 A1 May 18, 2023

Related U.S. Application Data

(60) Provisional application No. 63/278,624, filed on Nov. 12, 2021.

(51) Int. Cl.

| | |
|---|---|
| ***G06F 3/16*** | (2006.01) |
| ***G10L 21/0316*** | (2013.01) |
| ***G10L 25/48*** | (2013.01) |
| ***H04R 1/10*** | (2026.01) |
| ***H04R 1/40*** | (2006.01) |

(52) U.S. Cl.

CPC .............. *G06F 3/165* (2013.01); *G06F 3/162* (2013.01); *G10L 21/0316* (2013.01); *G10L 25/48* (2013.01); *H04R 1/10* (2013.01); *H04R 1/406* (2013.01); *H04R 2420/07* (2013.01)

(58) Field of Classification Search

CPC .......... G06F 3/165; G06F 3/162; H04R 1/10; H04R 1/406; H04R 2420/07; H04R 1/1016; H04R 2201/107; H04R 1/1041; G10L 19/00; G10L 2021/0135; G10L 21/003; H04M 2250/02; H04M 1/6066

See application file for complete search history.

(56) References Cited

U.S. PATENT DOCUMENTS

| | | | | |
|---|---|---|---|---|
| 6,339,706 | B1 * | 1/2002 | Tillgren ............ | H04M 1/72415 704/E15.045 |
| 7,925,029 | B2 | 4/2011 | Hollemans | |
| 9,294,832 | B2 | 3/2016 | Suvanto | |
| 9,686,612 | B2 | 6/2017 | Yerrace | |

(Continued)

*Primary Examiner* — Darioush Agahi

(74) *Attorney, Agent, or Firm* — Goodhue, Coleman & Owens, P.C.

(57) ABSTRACT

A method for audio modification for a wearable device in operative Bluetooth communication with a device includes receiving a sound signal at a microphone of the wearable device, encoding the sound signal at a digital signal processor of the wearable device using a codec to provide an encoded audio stream, routing the encoded audio stream from the digital signal processor over a Bluetooth parallel simultaneous transport channel to the device, modifying the encoded audio stream using an audio modification software application executing at a processor external to the wearable device to provide an encoded modified audio stream, communicating the encoded modified audio stream from the audio modification software application executing on the processor over the Bluetooth parallel simultaneous transport channel back to the wearable device, and communicating the encoded modified audio stream from the wearable device over a Bluetooth hands free profile (HFP) channel to the device.

23 Claims, 2 Drawing Sheets

(56) References Cited

U.S. PATENT DOCUMENTS

| | | | | |
|---|---|---|---|---|
| 10,459,686 | B1 * | 10/2019 | Lenke | G11B 27/038 |
| 2004/0215808 | A1 * | 10/2004 | Homma | H04L 5/14 709/232 |
| 2005/0070336 | A1 | 3/2005 | Tamura | |
| 2006/0098623 | A1 * | 5/2006 | Christian | H04K 1/02 370/352 |
| 2007/0082717 | A1 | 4/2007 | Lee | |
| 2011/0044324 | A1 | 2/2011 | Li | |
| 2011/0064235 | A1 | 3/2011 | Allston | |
| 2011/0129097 | A1 * | 6/2011 | Andrea | G10K 11/175 381/370 |
| 2012/0149343 | A1 | 6/2012 | Sanka | |
| 2015/0310725 | A1 * | 10/2015 | Koskan | G10L 15/02 704/274 |
| 2016/0057268 | A1 * | 2/2016 | Jiang | H04W 4/027 455/556.1 |
| 2016/0183046 | A1 * | 6/2016 | Kwon | H04W 4/029 455/456.1 |
| 2018/0020318 | A1 * | 1/2018 | Ramappa | H03M 3/024 |
| 2019/0166435 | A1 * | 5/2019 | Crow | H04R 25/43 |
| 2019/0180740 | A1 * | 6/2019 | Nandy | G10L 15/30 |
| 2020/0202700 | A1 | 6/2020 | Saurin | |
| 2021/0134321 | A1 * | 5/2021 | Laberge | H04R 25/505 |
| 2022/0021985 | A1 * | 1/2022 | Wexler | G10L 25/51 |
| 2022/0039041 | A1 * | 2/2022 | Zhu | H04L 12/40058 |
| 2022/0369034 | A1 * | 11/2022 | Kumar | H04B 17/318 |
| 2022/0391164 | A1 * | 12/2022 | Bonde | H04W 12/50 |

* cited by examiner

VOICE MODIFICATION FOR WEARABLE DEVICE

PRIORITY STATEMENT

This application claims priority to U.S. Provisional Patent Application 63/278,624, filed on Nov. 12, 2021, and entitled VOICE MODIFICATION FOR WEARABLE DEVICE, hereby incorporated by reference in their entirety.

FIELD OF THE INVENTION

The present invention relates to wearable device such as ear buds or other wireless earpieces. More particularly, but not exclusively, the present invention relates to provided voice modulation for audio streams from such devices when in Bluetooth communication with mobile devices.

BACKGROUND

Voice characteristics may be used to identify users. Although this may provide certain advantages in some applications, there are other instances where it may be beneficial to alter transmitted voice of a user in order to mask their identity or gender such as when using online streaming apps or games. It may be beneficial to modify the voice of a user through voice modulation techniques to provide an improved voice or a different voice for entertainment purposes such as a voice with entertaining effects or a voice that simulates the voice of others. Such effects may be used by gamers, content creators, professionals or others. Moreover, appropriate voice modulation may allow a user to share a version of their voice which best reflects their identity.

When used in applications such as streaming, voice modulations should occur in real-time. Yet, there may various problems with performing voice modulation in real-time using resources of a wireless earpiece. In particular, the digital signal processing required for desired voice modulation may be greater than processors of the wireless earpiece can perform, or may monopolize processing power, or increase battery usage to an undesired level. Therefore, it may not be practical to implement voice modulation performed directly by a wireless earpiece.

Moreover, if the wireless earpiece and a mobile device are connected using the Bluetooth protocols, for example, there are additional problems. In particular, where an earpiece is communicating with a mobile device such as a mobile phone in telephony use cases where the Hands-Free Profile (HFP) is used, if voice modification is not performed at the wireless earpiece, then voice modification would not appear feasible to one not having the benefit of the present disclosure.

Thus, despite the use of voice modification in some contexts, problems remain. In particular, new and useful methods, systems, and apparatus are needed which allow for voice modifications particularly when earpieces are used in conjunction with mobile devices.

SUMMARY

Therefore, it is a primary object, feature, or advantage of the present invention to improve over the state of the art.

It is a further object, feature, or advantage of the present invention to provide for real-time app-based audio modifications including voice modification.

It is a still further object, feature, or advantage of the present invention to provide for real-time app-based audio modifications including voice modification performed using wireless earpieces.

Another object, feature, or advantage is to provide for real-time app-based voice modulation performed using wireless earpieces using Bluetooth for communications and where the Hands-Free Profile (HFP) is needed to perform standard telephony functions.

Yet another object, feature, or advantage is to provide for matching the chosen codec to that currently used by the HFP profile such that processing may be performed without additional transcoding on the wireless earpieces. This results in the only performance cost being the transport.

A still further object, feature, or advantage to provide for noise reduction or signal enhancement and other types of audio modifications.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a method for voice modification for a wearable device in operative Bluetooth communication with a device includes receiving a voice sound signal at a microphone of the wearable device, encoding the voice sound signal at a digital signal processor of the wearable device using a codec to provide an encoded voice stream, routing the encoded voice stream from the digital signal processor over a Bluetooth parallel simultaneous transport channel to the device, modifying the encoded voice stream using a voice modification software application executing at a processor external to the wearable device to provide an encoded modified voice stream, communicating the encoded modified voice stream from the voice modification software application executing on the processor over the Bluetooth parallel simultaneous transport channel back to the wearable device, and communicating the encoded modified voice stream from the wearable device over a Bluetooth hands free profile (HFP) channel to the device.

According to another aspect, a system includes a wearable device, the wearable device includes a digital signal processor, a processor operatively connected to the digital signal processor, a microphone operatively connected to the digital signal processor, and a Bluetooth transceiver operatively connected to the processor. The system further includes a device having a Bluetooth transceiver adapted for connecting with the Bluetooth transceiver of the wearable device. The system further includes voice modification software application executing on a processor remote from the wearable device. The digital signal processor may be configured to receive a voice sound signal and encode the voice sound signal using a codec to provide an encoded voice stream. The wearable device may be configured to route the encoded voice stream from the digital signal processor over a Bluetooth simultaneous parallel transport channel from the Bluetooth transceiver of the wearable device to the device. The voice modification software application executing on the processor may be configured to modify the encoded voice stream at the processor to provide an encoded modified voice stream. The device may be configured to communicate the encoded modified voice stream over the Bluetooth simultaneous parallel transport channel back to the wearable device. The wearable device may be configured to communicate the encoded modified voice stream from the wearable device over a channel to the device using a Bluetooth hands free profile (HFP).

According to one aspect of the present disclosure, for real-time app-based voice modification, microphone data is intercepted during HFP (telephony) use cases and the encoded data is passed via a parallel simultaneous transport channel to the phone for modification then back to the earbud where it is then sent out the normal Hands Free Profile (HFP) path. Meanwhile the control makes use of a standard control channel (e.g. AT Commands or other types of commands). This allows for enabling and disabling this feature. As well events can come back to the external application which has an interface to modify the algorithm based on either earbud events or the mobile UI interactions.

According to another aspect, a method for voice modification for a wearable device in operative Bluetooth communication with a mobile device having telephony functions is provided. The method includes receiving a voice sound signal at a microphone of the wearable device, encoding the voice sound signal at a digital signal processor of the wearable device to provide an encoded voice stream, and routing the encoded voice stream from the digital signal processor over a parallel simultaneous transport channel (such as a Bluetooth serial port profile (SPP) channel) to a voice modification software application executing on a processor of the mobile device having telephony functions. The method further includes modifying the encoded voice stream at the processor of the mobile device to provide an encoded modified voice stream, communicating the encoded modified voice stream from the voice modification software application executing on the processor of the mobile device over the parallel simultaneous transport channel back to the wearable device, and communicating the encoded modified voice stream from the wearable device over a Bluetooth hands free profile (HFP) channel to the mobile device. The wearable device may be a wireless earpiece such as an ear bud. The encoding for the voice stream may be continuously variable slope delta modulation (CSVD) or modified sub band coding (mSBC) encoding. The microphone may be a microphone array. The method may further include enabling a voice modification for telephony mode by sending an enable signal from the mobile device over a commands and events channel to a processor of the wearable device. The commands and events channel may be a parallel simultaneous transport channel for commands and events. The method may further include disabling the voice modification for telephony mode by sending a disable signal from the mobile device over the commands and events channel to the processor of the wearable device. The modifying the encoded voice stream may include modifying the encoded voice stream to alter at least one of amplitude, pitch, and tone. The modifying the encoded voice stream may include mixing at least one separate sound source. The modifying the encoded voice stream may include adding a sound effect or applying a filter.

According to another aspect of the present disclosure a system is provided. The system includes a wearable device, the wearable device having a digital signal processor, a processor operatively connected to the processor, a microphone operatively connected to the digital signal processor, and a Bluetooth transceiver operatively connected to the processor. The system further includes a voice modification software application executing on a processor of a mobile device, the mobile device having a cellular transceiver and a Bluetooth transceiver operatively connected to the processor. The digital signal processor is configured to receive a voice sound signal and encode the voice sound signal to provide an encoded voice stream. The wearable device is configured to route the encoded voice stream from the digital signal processor over a parallel simultaneous transport channel from the transceiver of the wearable device to the voice modification software application executing on the processor of the mobile device. The voice modification software application executing on the processor of the mobile device is configured to modify the encoded voice stream at the processor of the mobile device to provide an encoded modified voice stream. The mobile device is configured to communicate the encoded modified voice stream from the voice modification software application executing on the processor of the mobile device over the channel back to the wearable device. The wearable device is configured to communicate the encoded modified voice stream from the wearable device over a Bluetooth hands free profile (HFP) channel to the mobile device. The wearable device may be wireless earpiece such as a wireless ear bud. The encoded voice stream may be CSVD or mSBC encoded or otherwise encoded. The microphone may be a microphone array. The wearable device may be further configured to enable a voice modification for telephony mode by sending an enable signal from the mobile device over a commands and events channel to the processor of the wearable device.

According to another aspect, a method for signal enhancement for a wearable device in operative Bluetooth communication with a device is provided. The method includes receiving a sound signal at a microphone of the wearable device, encoding the sound signal at a digital signal processor of the wearable device using a codec to provide an encoded sound stream, routing the encoded voice stream from the digital signal processor over a Bluetooth parallel simultaneous transport channel to the device, modifying the encoded sound stream using a software application executing at a processor external to the wearable device to provide an encoded modified sound stream, communicating the encoded modified sounds stream from the software application executing on the processor over the Bluetooth parallel simultaneous transport channel back to the wearable device, and communicating the encoded modified sound stream from the wearable device over a Bluetooth hands free profile (HFP) channel to the device.

According to another aspect, a method for sound modification for a wearable device in operative Bluetooth communication with a device is provided. The method includes receiving a sound signal at a microphone of the wearable device, encoding the sound signal at a digital signal processor of the wearable device using a codec to provide an encoded audio stream, routing the encoded audio stream from the digital signal processor over a Bluetooth parallel simultaneous transport channel to the device, modifying the encoded audio stream using an audio modification software application executing at a processor external to the wearable device to provide an encoded modified audio stream, communicating the encoded modified audio stream from the audio modification software application executing on the processor over the Bluetooth parallel simultaneous transport channel back to the wearable device, and communicating the encoded modified voice stream from the wearable device over a Bluetooth hands free profile (HFP) channel to the device.

BRIEF DESCRIPTION OF THE DRAWINGS

Illustrated embodiments of the disclosure are described in detail below with reference to the attached drawing figures, which are incorporated by reference herein.

DETAILED DESCRIPTION

The present invention is disclosed with respect to a specific example where a wearable device in the form of an earpiece is used and where a microphone of the earpiece is used to detect an audio signal in the form of a voice sound signal which contains the user's voice and which then may be modified at a remote device such as to modify the user's voice. It is to be understood that different types of audio signals may be detected and different types of processing may occur remotely. Thus, for example, instead of modifying a speaker's voice, the audio signal may be otherwise enhanced, noise may be removed, or other modifications may be performed as may be appropriate for a particular use case.

Figure 1:
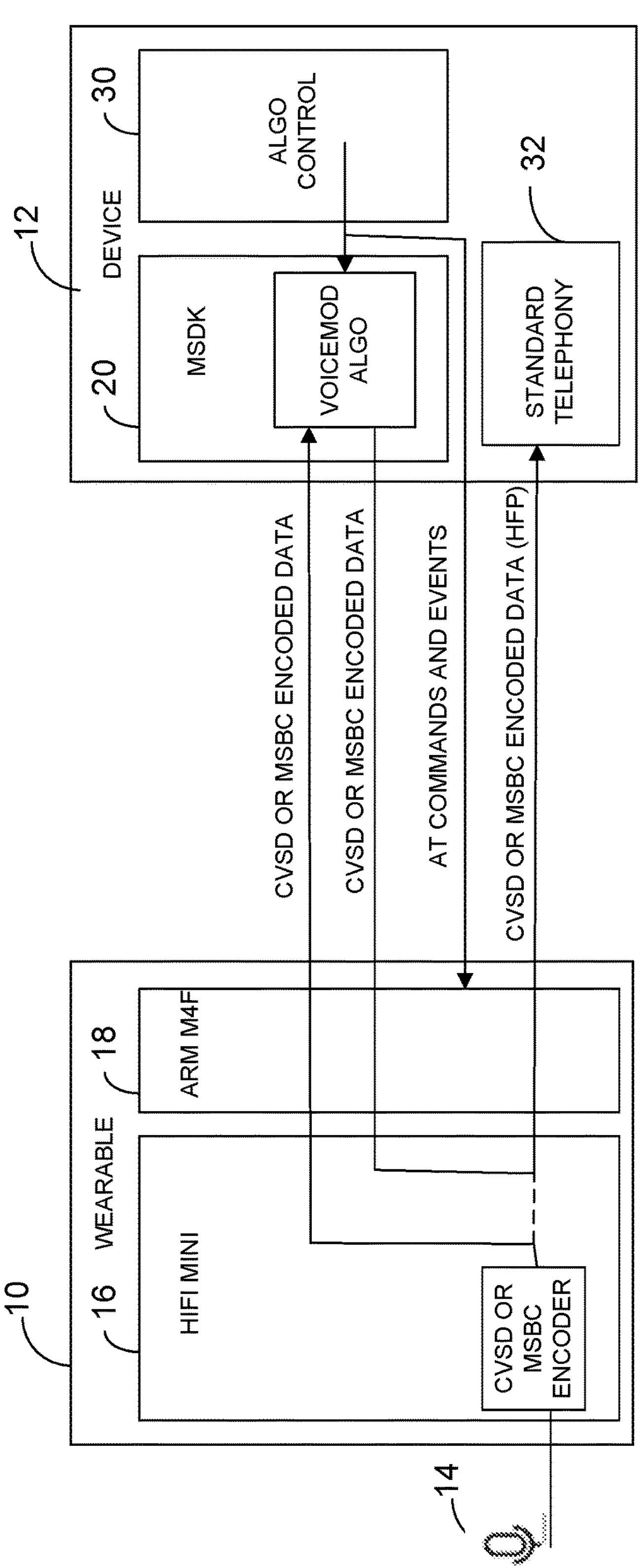
FIG. 1 is an overview of one example of the present disclosure.

FIG. 1 is an overview of one example of the present disclosure. In FIG. 1 there is a wearable device in the form of an earpiece in the form of an earbud 10 and a device 12. The device 12 may be a mobile device such as a phone, table, gaming device, computer, or other type of computing device. In operation, where the earbud 10 is Bluetooth paired with the device 12, the microphone 14 of the earbud 10 is used to detect voice sound information of a user. Although a single microphone 14 is shown it is to be understood that more or fewer microphones may be present whether physically present at the earbud 10 or a second earbud (not shown) in operative communication with earbud 10 or otherwise in communication with earbud 10. The microphone 14 may also be a small array microphone or other suitable microphone.

An audio stream from the earbud 10 is encoded using an appropriate audio coding method which may be a voice coding method. Any number of voice coding methods may be used. Two examples of voice coding methods which may be used are Continuously Variable Slope Delta Modulation (CVSD) and Modified Sub Band Coding (mSBC). The voice coding methods may be implemented by a processor such as a digital signal processor 16 with an encoder module. One example of such a processor which may be used is a Tensilica HiFi Mini DSP core. A processor 18 is also shown which may be an ARM M4F processor or other suitable processor.

Once the audio in the stream is encoded it is communicated to the device 12 according to the specifications of a particular Bluetooth profile or other specifications as may be appropriate in a particular application. The resulting audio stream or voice stream is received at a software application 20 executing on the device 12. The software application may provide for functionality to perform voice modification on the voice stream and/or other types of modification of an audio stream. The voice modification may be of any number of types, and may be of varying complexity. This may include real-time voice changing and custom sound effects. It may involve algorithms for modifying amplitude, pitch, and tone. Examples of effects may include mixing with a separate sound source, adding a reverberation effect, changing the pitch, filtering voice signal frequencies or otherwise modifying the voice signal to obtain a desired effect. Of course, instead of voice modification, the processing may be performed to otherwise modify the audio stream such as to reduce or eliminate noise, to identify and enhance particular aspects of the audio stream or any other type of audio processing which may be appropriate in a particular use case.

The software application 20 may be associated with a mobile software developer kit (mSDK) used to implement the audio or voice modification software application. The device 12 may also include an external application 30 which may provide for algorithmic control of the audio or voice modification software application. In some embodiments the functionality of the device 12 may be separated into different devices (both remote or external from the wearable). For example, the external application 30 may be executed on a different device.

Wireless earpieces such as ear buds may implemented various Bluetooth profiles. For example, a Serial Port Profile (SPP) is one example of a profile for sending data between devices such as between a wireless earpiece 10 and a device 12. The Hands-Free Profile (HFP) is used by wireless earpiece 10 which allows for using the wireless earpiece 10 to perform common phone interactions or standard telephony functions. As shown in FIG. 1, after the audio or voice modification software application 20 generates a modified voice signal, this modified voice signal (which is coded, such as in the same way that the original voice sound signal was encoded) is sent back to the wireless earpiece 10. From there, the modified voice signal is communicated via the HFP from the wireless earpiece to the standard telephony functions 32 of the device 12. Thus, a modified voice may be generated based on audio received from the microphone 14 of the wireless earpiece 10 in real-time using the software application 20 executing on the device 12. It should also be understood, that any number of types of audio modifications may be made whether to alter the sound of the voice, enhance the voice, reduce noise, enhance environmental signals, modify environmental signals or otherwise.

During the process, command and events may be communicated from the external application to the wireless earpiece 10 via a parallel simultaneous transport channel as shown in FIG. 1. Commands may, for example, be AT commands, or other types of commands. The standard control channel allows for changing settings or otherwise implementing control such as to enable or disable this feature. The external application may also modify the voice modulation algorithm or other types of audio modification algorithms. This may be performed in different ways. For example, this may be in response to events determined by the wireless earpiece. Alternatively, this may be in response to mobile user interface actions. For example, a user can change settings or preferences regarding the voice modification using the user interface of the mobile phone. Where other types of audio modification are desired, these may be likewise modified through settings or preference.

Thus, in operation, a wireless earpiece or a set of wireless earpieces may be used in conjunction with a mobile device such as a mobile phone with an audio modification software application such as a voice modification software application having a plurality of instructions executing on or more processors of the mobile phone to provide app-based real-time voice modification capabilities or other types of audio modifications. In operation, the modified voice signal is communicated from the mobile phone back to the wireless earpiece via the parallel simultaneous transport channel and then from the wireless earpiece back to the standard telephony components of the device via the HFP. This overcomes the limitations presented with HFP (telephony) use cases while still allowing for voice modification in real-time. One of the key advantages of this methodology is that by matching the chosen codec to that currently used by the HFP profile allows the processing to be performed without additional transcoding on the wireless earpiece. Thus, the only performance cost is the transport.

The methods described herein may be incorporated into software in the form of instructions stored on a non-transitory computer readable medium such as a memory. Certain instructions may be performed by one or more processors of the wireless earpiece such as an ARM M4F processor or a HiFi Mini digital signal processor. Other instructions may be performed by a mobile device or phone and one or more processors of the phone.

In some embodiments, the device using HFP need not be the device where the external audio processing instructions are executed. For example, in one embodiment a gaming console might be using the wireless earpieces via HFP but the processing may be performed on a mobile device such as a phone. Thus, although FIG. 1 illustrates a device 12 which is using HFP for communications with the wireless earpiece 10 and which performs audio processing, this functionality may be separated into two separate devices.

Although FIG. 1 illustrates a single ear bud, it is to be understood that the methodologies presented may be used with a set of wireless earpieces, a wireless headset or other types of wearable devices which are used in voice communications. Although specific examples of processors are described, it is to be understood that any number of other processors may be used. Although specific types of encoding are described, it is to be understood that other types of encoding may be used. It is to be further understood that the specific functionality of a voice modification software application or app may vary significantly depending on the specific application or desired use by a user.

Although in the above example, there is discussion of voice sound signals and voice modification software, it is to be understood that the voice sound signal is one example of an audio signal. The audio signal may contain voice sound, ambient or environmental sounds, non-voice sounds made by a body of an individual, voice sounds from more than one individual and any number of combinations thereof. Similarly, the voice modification software is one functionality which may be provided by audio modification software which may alternatively or additionally be configured to provide other types of audio modification including noise reduction, signal enhancement, and any number of types of audio processing as may be appropriate or desired for a particular use case.

Figure 2:
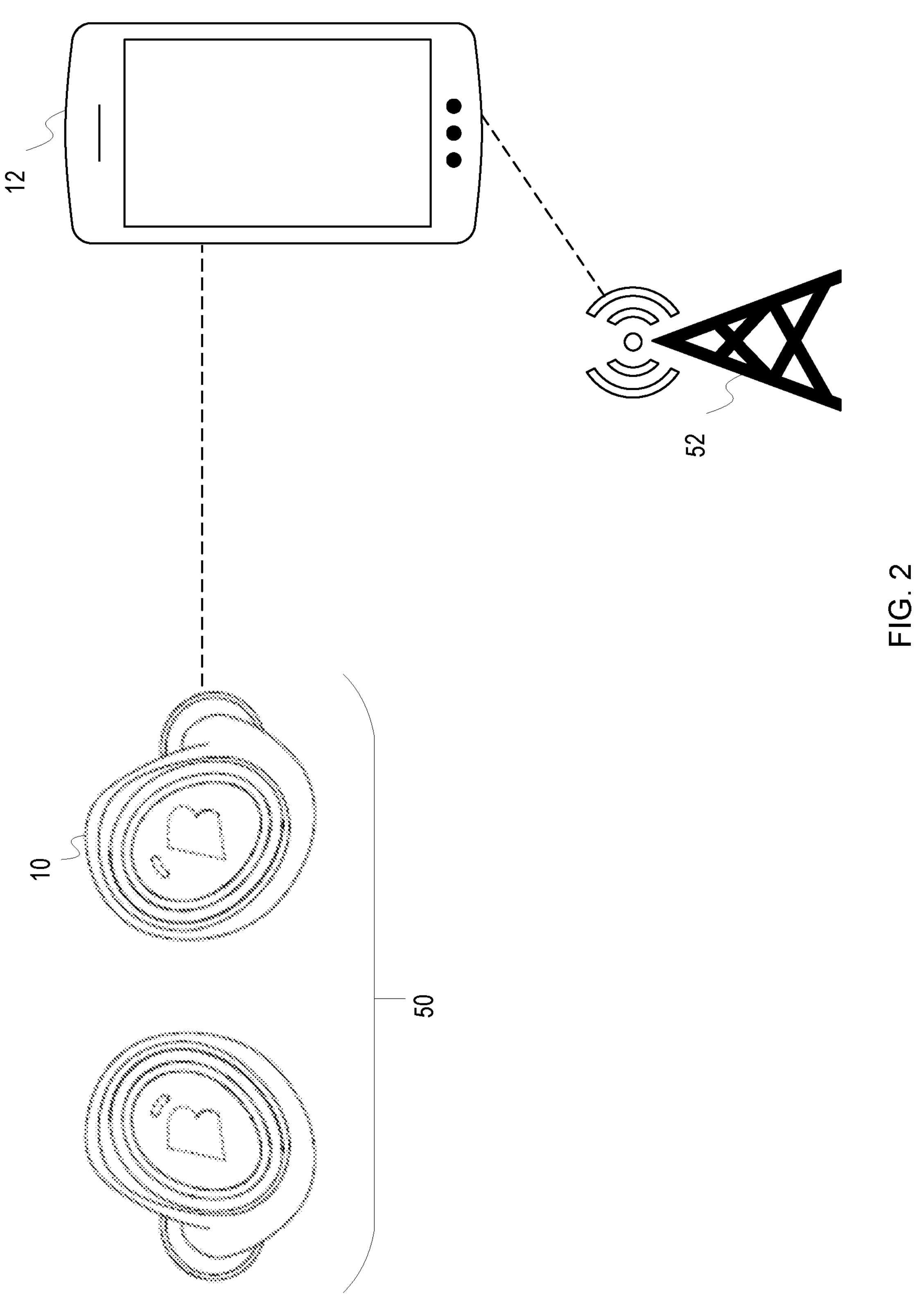
FIG. 2 illustrates the wireless earpiece may be an ear bud within a set of wireless earpieces or ear buds.

FIG. 2 illustrates the wireless earpiece 10 may be an ear bud within a set of wireless earpieces or ear buds. However, it is contemplated that a single ear bud may be used and that the single ear bud may be tethered or untethered to the second ear bud in the set. Alternatively, other types of wearable devices may be used including watches, glasses, jewelry, or any number of other types of wearable devices. The wireless earpiece 10 is shown in Bluetooth communication with a device 12 such as a mobile phone which may be in cellular connection to a cellular tower or otherwise provide telephony functions. The device 12 may include a cellular transceiver in the conventional manner. As previously mentioned the device 12, may be a generic computer, table computer, phone, or other type of device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor such as one or more central processing units (CPUs) and/or one or more graphics processing units (GPUs)) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single device, but deployed across a number of devices. Where the term "channel" is used, it is to be understood that the term may encompass a single channel or a set of parallel channels.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computing device) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. It is to be further understood, that aspects of different embodiments may be combined.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The invention is not to be limited to the particular embodiments described herein. In particular, the invention contemplates numerous variations in the specific hardware components methods performed, type of encoding, type of voice modification functions, type of wearable device, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

What is claimed is:

1. A method for audio modification for a wearable device in operative Bluetooth communication with a device, the method comprising:

receiving an audio signal at a microphone of the wearable device;

encoding the audio signal at a digital signal processor of the wearable device using a codec to provide an encoded audio stream;

routing the encoded audio stream from the digital signal processor over a Bluetooth parallel transport channel that operates concurrently with and is distinct from a Bluetooth hands free profile (HFP) channel to the device;

modifying the encoded audio stream using an audio modification software application executing at a processor external to the wearable device to provide an encoded modified audio stream;

communicating the encoded modified audio stream from the audio modification software application executing on the processor over the Bluetooth parallel transport channel back to the wearable device; and thereafter communicating the encoded modified audio stream from the wearable device over the Bluetooth hands free profile (HFP) channel to the device.

2. The method of claim 1 wherein the audio signal comprises a voice sound signal.

3. The method of claim 1 wherein the wearable device is a wireless earpiece.

4. The method of claim 1 wherein the wearable device is a wireless ear bud.

5. The method of claim 1 wherein the encoded audio stream is a continuously variable slope delta modulation (CVSD) encoded audio stream.

6. The method of claim 1 wherein the encoded audio stream is a modified sub band coding (mSBC) encoded audio stream.

7. The method of claim 1 wherein the microphone is a microphone array.

8. The method of claim 1 further comprising enabling an audio modification for telephony mode by sending an enable signal from the device over a commands and events channel to a processor of the wearable device.

9. The method of claim 8 wherein the commands and events channel is a Bluetooth channel for commands and events.

10. The method of claim 8 further comprising disabling the audio modification for telephony mode by sending a disable signal from the device over the commands and events channel to the processor of the wearable device.

11. The method of claim 1 wherein the modifying the encoded audio stream comprises modifying the encoded audio stream to alter at least one of amplitude, pitch, and tone.

12. The method of claim 1 wherein the modifying the encoded audio stream comprises mixing at least one separate sound source.

13. The method of claim 1 wherein the modifying the encoded audio stream comprises adding a sound effect.

14. The method of claim 1 wherein the modifying the encoded audio stream comprises applying a filter.

15. The method of claim 1 wherein the Bluetooth hands free profile (HFP) channel uses the codec.

16. A system comprising:

a wearable device, the wearable device comprising a digital signal processor, a processor operatively connected to the digital signal processor, a microphone operatively connected to the digital signal processor, and a Bluetooth transceiver operatively connected to the processor;

a device having a Bluetooth transceiver adapted for connecting with the Bluetooth transceiver of the wearable device;

an audio modification software application executing on a processor remote from the wearable device;

wherein the digital signal processor is configured to receive an audio signal and encode the audio signal using a codec to provide an encoded audio stream;

wherein the wearable device is configured to route the encoded audio stream from the digital signal processor over a Bluetooth parallel transport channel that operates concurrently with and is distinct from a Bluetooth hands free Profile (HFP) channel from the Bluetooth transceiver of the wearable device to the device;

wherein the audio modification software application executing on the processor is configured to modify the encoded audio stream at the processor to provide an encoded modified audio stream;

wherein the device is configured to communicate the encoded modified audio stream over the Bluetooth parallel transport channel back to the wearable device; and wherein the wearable device is configured to communicate the encoded modified audio stream from the wearable device over the Bluetooth hands free profile (HFP) channel to the device.

17. The system of claim 16 wherein the wearable device is a wireless earpiece.

18. The system of claim 16 wherein the wearable device is a wireless ear bud.

19. The system of claim 16 wherein the encoded audio stream is a continuously variable slope delta modulation (CVSD) encoded audio stream.

20. The system of claim 16 wherein the encoded audio stream is a modified sub band coding (mSBC) encoded audio stream.

21. The system of claim 16 wherein the microphone is a microphone array.

22. The system of claim 16 wherein the Bluetooth hands free profile (HFP) uses the codec.

23. The system of claim 16 wherein the wearable device is further configured to enable an audio modification for telephony mode by sending an enable signal from the device over a commands and events channel to the processor of the wearable device.

* * * * *